US006396217B1

(12) United States Patent
Weindorf

(10) Patent No.: US 6,396,217 B1
(45) Date of Patent: May 28, 2002

(54) BRIGHTNESS OFFSET ERROR REDUCTION SYSTEM AND METHOD FOR A DISPLAY DEVICE

(75) Inventor: Paul Fredrick Luther Weindorf, Novi, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 19 days.

(21) Appl. No.: 09/748,528

(22) Filed: Dec. 22, 2000

(51) Int. Cl.[7] .................................................. G01J 1/32

(52) U.S. Cl. ................................. 315/169.1; 315/169.3

(58) Field of Search ................................. 315/158, 159, 315/169.3, 169.1

(56) References Cited

U.S. PATENT DOCUMENTS 5,272,327 A * 12/1993 Mitchell et al. ............ 250/205

* cited by examiner

*Primary Examiner*—David Vu
(74) *Attorney, Agent, or Firm*—Brinks Hofer Gilson & Lione; Richard K. Clark

(57) ABSTRACT

This invention provides a brightness offset error reduction system for a display device, which may have a lighted display panel and control circuitry. The lighted display may be backlit, frontlit, or emissive. The brightness offset error reduction system has voltage divider circuitry for receiving an output voltage from digital-to-analog converter (DAC) circuitry. The voltage divider circuitry provides a fractional portion of the output voltage as a divided output voltage. This division of the output voltage reduces brightness offset errors and may increase the brightness resolution at low luminance levels.

57 Claims, 5 Drawing Sheets

Δ = Aim □ = Divided Output Voltage ◊ = "Not Divided" Output Voltage

NIGHTTIME BRIGHTNESS RATIO -- 16 NIT RANGE

Δ = Aim □ = Divided Output Voltage ◊ = "Not Divided" Output Voltage

BRIGHTNESS OFFSET ERROR REDUCTION SYSTEM AND METHOD FOR A DISPLAY DEVICE

CROSS REFERENCE TO RELATED APPLICATIONS

The following co-pending and commonly assigned U.S. patent applications have been filed on the same day as this application. All of these applications relate to and further describe other aspects of the embodiments disclosed in this application and are incorporated in this application by reference in their entirety.

U.S. patent application Ser. No. 09/747,597, "AUTOMATIC BRIGHTNESS CONTROL SYSTEM AND METHOD FOR A DISPLAY DEVICE USING A LOGARITHMIC SENSOR," filed on Dec. 22, 2000, and U.S. patent application Ser. No. 09/748,615, "VARIABLE RESOLUTION CONTROL SYSTEM AND METHOD FOR A DISPLAY DEVICE," filed on Dec. 22, 2000.

FIELD OF THE INVENTION

This invention generally relates to display devices. More particularly, this invention relates to display devices having offset error reduction for brightness resolution control.

BACKGROUND OF THE INVENTION

Display devices are used in a variety of consumer and industrial products to display data, charts, graphs, messages, other images, information, and the like. Backlight display devices, which may be backlit or frontlit, have a backlight positioned to provide light for a display panel. Emissive display devices have pixels that are the emissive light source. In emissive displays, the pixel light source may be CRT phosphor, FED phosphor, a light emitting diode (LED), an organic diode, an electroluminescent, or any emissive display technology. In backlight display devices, the backlight may be a fluorescent tube, an electro-luminescent device, LED, a gaseous discharge lamp, a plasma panel, and the like. The display panel may be a passive or active matrix liquid crystal display (LCD). The backlight and display panel are connected to control circuitry, which is connected to a voltage supply. The display device may be separate or incorporated with other components, such as a dashboard in an automobile or other vehicle, a portable electronic device, and the like.

Generally, a display device controls brightness in relation to the environment of the display device and user preferences. In some applications, the brightness may remain at an essentially fixed level for an extended time period. In other applications, the brightness is adjusted frequently because of changes in the environment, user preferences, and similar factors. The control circuitry may automatically adjust the brightness. A user may further adjust or manually set the brightness through a user interface, such as a knob, switch, keypad, touch screen, remote device, or the like.

To change or adjust the brightness, the control circuitry receives an input signal indicating a user preference, an environmental condition, or the like. The control circuitry selects a luminance value corresponding to the input signal. The luminance value is converted into an analog control signal or an output voltage. The control circuitry provides the analog control signal to the backlight, the display panel, or both. The control circuitry may modify or further adjust the analog control signal and may combine the analog control signal with other inputs to operate the display device at the desired brightness.

The control circuitry typically has a single digital-to-analog converter (DAC) or PWM plus a filter to convert the luminance into the analog control signal. A higher resolution DAC may be used to provide sufficient adjustment resolution for lower levels, the dynamic range, and an exponential output signal. A typical DAC for brightness resolution control may have 12 bits for use in a dynamic range of about 0.5 nits through about 400 nits.

During the digital to analog conversion, the DAC may introduce offset errors into the analog control signal or output voltage. Offset errors are inherent to DACs and may result from the digitizing process and other factors. Offset errors generally are constant errors over essentially an entire dynamic range. Other DAC errors such as quantization errors and linearity errors may result. For digital processing, signal values may be rounded or truncated to form an integer. A quantization error may result when the responsive analog control signal provides a brightness level different from the brightness level corresponding to the selected luminance value. As brightness resolution increases, more quantization errors may result due to the increase in brightness adjustment steps and other factors. Additionally, as the brightness level decreases, the offset error and quantization error increases the error of the desired output brightness.

At lower display luminance levels, there may be more offset errors and more noticeable offset errors. While the digital data input into the DAC typically has a linear progression, the analog control signal from the DAC has constant ratio steps or an exponential progression for a user to perceive the brightness adjustments. Brightness adjustments need constant ratio steps which results in the need for variable resolution control because of how a human eye perceives changes in brightness. The human vision system perceives changes in brightness non-linearly and logarithmically. A user perceives a brightness change from about 10 nits to about 12 nits as essentially equal to a brightness change from about 100 nits to about 120 nits. As the brightness level decreases, more brightness control resolution is needed to accurately provide the brightness step changes that are perceived as uniform by a user. This exponential progression may make offset and quantization errors more noticeable to a user at lower luminance levels. A brightness offset and quantization error of 1 nit is about one percent of a brightness level equal to 100 nits. The same brightness error is about 10 percent of a brightness level equal to 10 nits. As a result, the acceptable amount of brightness offset error decreases as the luminance or brightness level decreases.

Offset errors generally are unacceptable, especially at lower luminance values. A higher resolution DAC may reduce the offset errors, but increase the cost of the display device. A higher resolution DAC may reduce the quantization errors, but increase the cost of the display device and generally does not significantly reduce the offset error because virtually all DACs have offset error. Other approaches include correcting the offset error on a per unit basis or using a complex feedback system that requires a precise digital-to-analog converter with corresponding software to provide the offset error correction. These approaches are difficult to implement and may increase the cost of the display device.

SUMMARY

This invention provides a brightness offset error reduction system for display devices. The brightness offset error reduction system may divide the output voltage from digital-to-analog (DAC) circuitry used to control the brightness of the display device. This division of the output voltage may be used to reduce brightness offset errors and may be used to increase the brightness resolution at low luminance levels, such as nighttime applications. The brightness offset error reduction system may be used in automotive and similar applications where the maximum nighttime brightness is a divided ratio of the maximum daytime brightness.

In one aspect, a display device with a brightness offset error reduction system has a lighted display, digital-to-analog (DAC) circuitry, and voltage divider circuitry. The voltage divider circuitry is operatively connected to receive an output voltage from digital-to-analog converter (DAC) circuitry. The voltage divider circuitry provides a fractional portion of the output voltage as a divided output voltage to the lighted display.

In another aspect, a brightness offset error reduction system for a display device has digital-to-analog converter (DAC) circuitry and voltage divider circuitry. The voltage divider circuitry has a switching mechanism and is operatively connected to receive an output voltage from the DAC circuitry. The voltage divider circuitry provides a divided output voltage when the switching mechanism is engaged.

In a method for reducing the brightness offset error, a luminance value is converted into an output voltage. A determination is made whether the output voltage is to be divided. A fractional portion of the output voltage is provided when the output voltage is to be divided.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PREFERRED EMBODIMENTS

Figure 2:
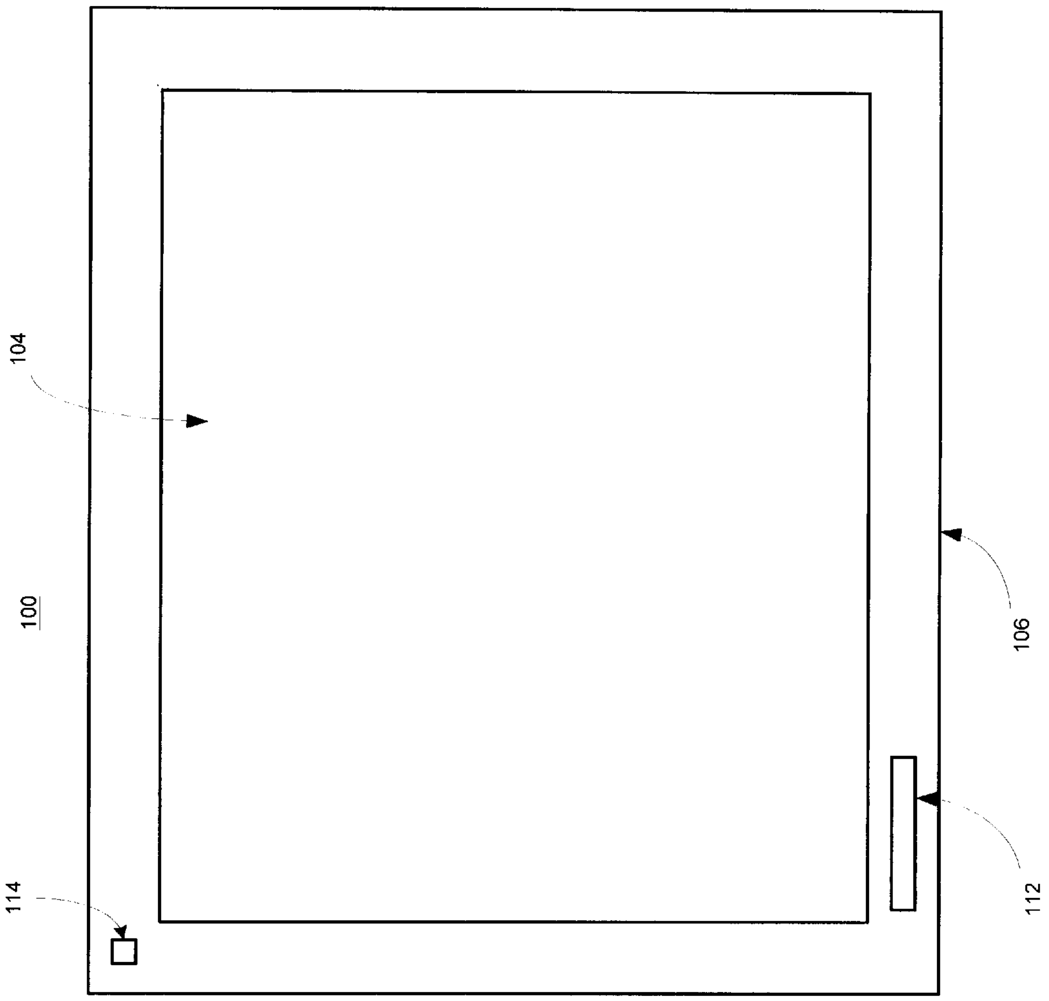
FIG. 2 represents a front view of the backlight display device shown in FIG. 1.
Figure 1:
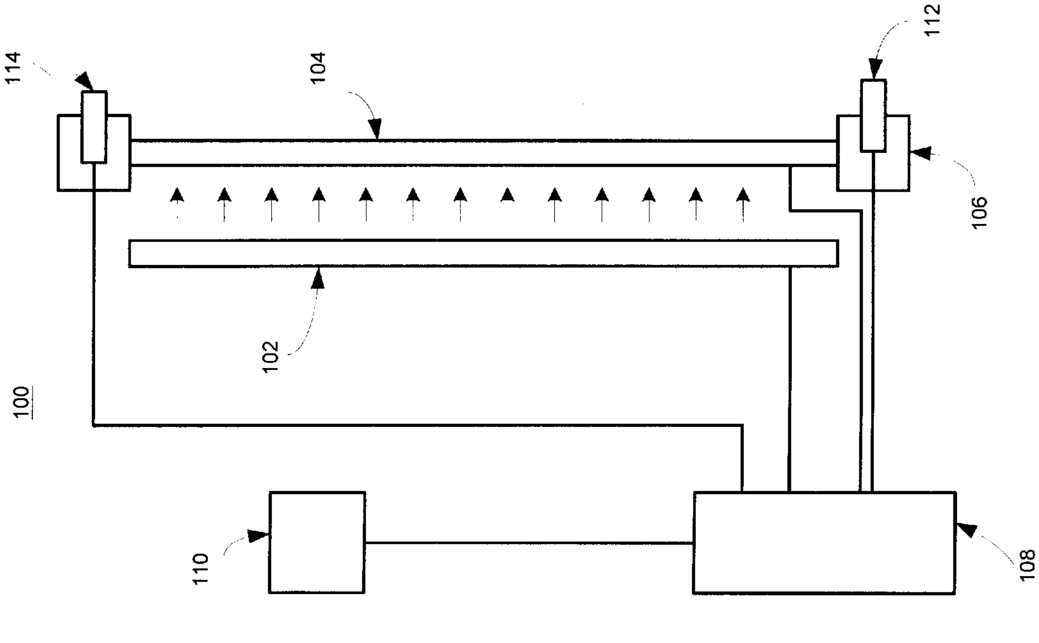
FIG. 1 represents a side view of a backlight display device having an automatic brightness control system according to one embodiment.

FIGS. 1 and 2 represent block diagrams of a backlight display device 100 having a brightness offset error reduction system according to one embodiment. FIG. 1 shows a side view of the backlight display device 100. FIG. 2 shows a front view of the backlight display device 100. In this embodiment, the backlight display device 100 has a backlight 102, a display panel 104, a bezel 106, control circuitry 108, a voltage supply 110, a user interface 112, and an ambient light sensor 114. The backlight display device 100 may have additional or fewer components and may have different configurations.

The backlight display device 100 may provide a reverse image for rear projection, may project an image onto a display surface (not shown), may have one or more magnification lens (not shown) and reflective surfaces (not show), and may work with or have other components. The backlight display device 100 may be incorporated in a navigation radio system for an automobile or other vehicle. The backlight display device 100 may be built-in or integrated with a dashboard, control panel, or other part of an automobile or other vehicle. The backlight display device 100 also may be built-in or integrated with an electronic device such as a cell phone or other communication device, a laptop or other personal computer, a personal organizer, and the like. Additionally, the backlight display device 100 may be separate or a separable component. While configurations and modes of operation are described, other configurations and modes of operation may be used.

In one aspect, the backlight 102 and the display panel 104 form a liquid crystal display (LCD). The backlight 102 and the display panel 104 may be a passive or active matrix LCD and may comprise another type of lighted display, which may be a backlit or frontlit display and may be an emissive display such as an LED or other pixel light source. In this embodiment, the backlight 102 is operatively disposed to provide light for operation of the display panel 104. The backlight 102 and the display panel 104 may provide monochrome, color, or a combination of monochrome and color displays. In this embodiment, the backlight 102 is a cold cathode fluorescent lamp. The backlight 102 may be one or more fluorescent tubes, electro-luminescent devices, gaseous discharge lamps, plasma panels, LED, a combination, and the like, which may be aligned. The backlight 102 may include multiple or sub backlights. The display panel 104 may be selected based on the type of backlight and may have multiple or sub display panels. The bezel 106 may extend around and hold the outer perimeter of the display panel 104. The bezel 106 may have various configurations and may extend around part or only a portion of the outer perimeter. The bezel 106 may hold or extend around other components such as the backlight 102. The bezel 106 also may include additional bezels and may be connected with or be part of another component such as a dashboard in an automobile.

The control circuitry 108 provides an image signal to the backlight 102 and/or the display panel 104. The control circuitry 108 may include one or more microprocessors (not shown) and may be part or incorporated with other circuitry such as a central processing unit or a vehicle control unit. The control circuitry 108 may be completely or partially provided on one or more integrated circuit (IC) chips. The control circuitry 108 may have other circuitry for control and operation of the backlight display device 100 such as a transceiver, one or more memory devices, and the like. The control circuitry 108 also is connected to a voltage supply 110, which may be provided by an automotive battery or electrical system, another type of battery, a household current supply, or other suitable power source.

The control circuitry 108 may generate the image signal and may pass the image signal from another source (not shown). The image signal may be based upon one or more radio signals, one or more signals from a global positioning system (GPS), data stored in a memory device, user inputted data, a combination or combinations of these signals and data, and the like.

Along with the image signal, the control circuitry 108 provides a command brightness signal or output voltage to control the brightness of the display panel 104. The command brightness signal or output voltage corresponds to a luminance value for the desired or selected brightness. The command brightness signal changes as different luminance values are used. To adjust or control the brightness, the control circuitry 108 may receive one or more input or analog signals indicating a user preference, an environmental condition, and other factors. The user interface 112, the ambient light sensor 114, and other input devices may provide the input signal. The control circuitry 108 uses one or more of the input signals to select a luminance. The luminance value may be in the range of about 0.5 nits through about 400 nits. In one aspect, the luminance value is in the range of about 0.5 nits through about 60 nits for nighttime applications and the like. In another aspect, the luminance value is in the range of about 80 nits through 400 nits for daytime applications and the like.

Figure 3:
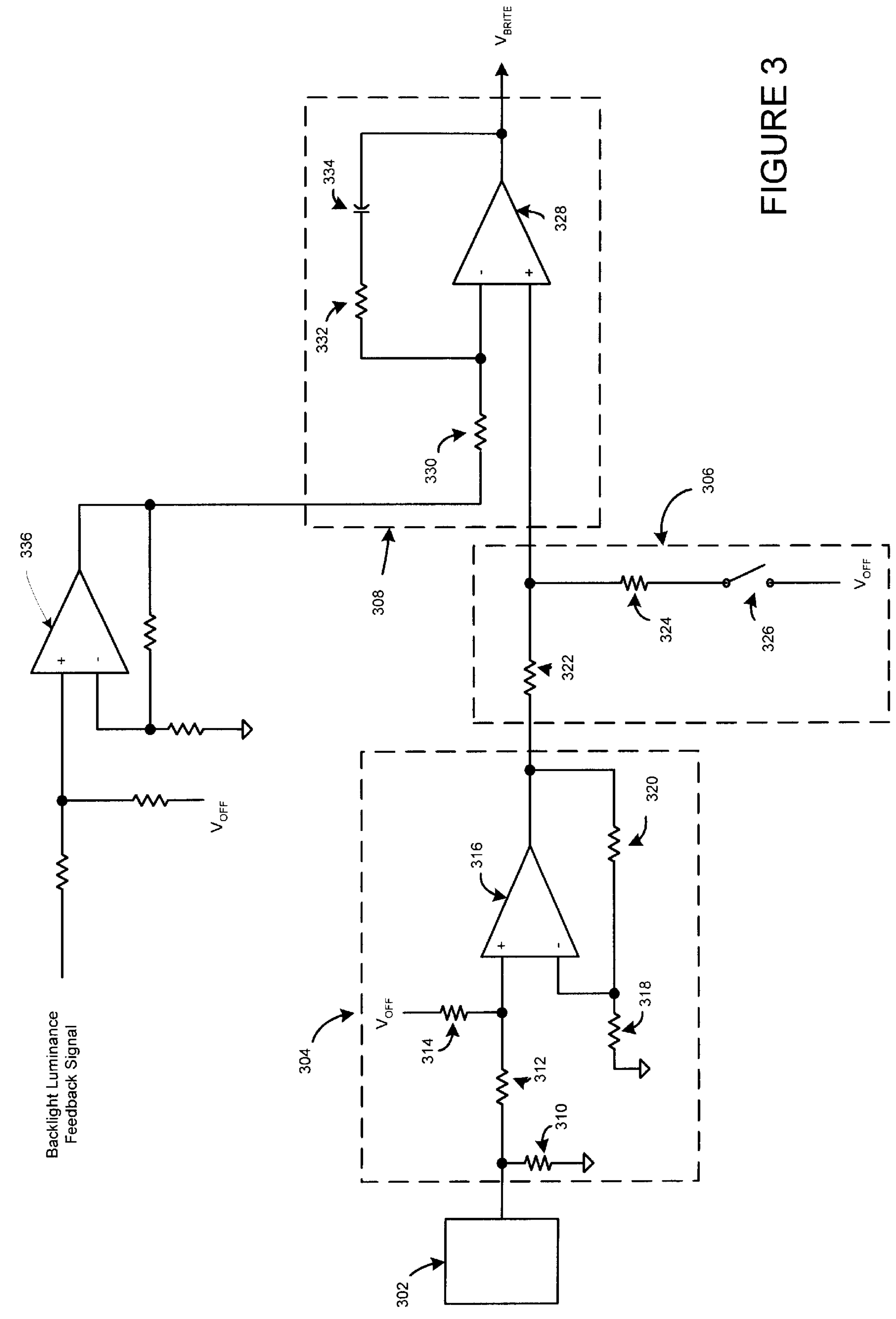
FIG. 3 represents a block diagram and flowchart of a brightness offset error reduction system for a display device according to one embodiment.

The control circuitry 108 has digital-to-analog converter (DAC) circuitry and voltage divider circuitry (see FIG. 3). The DAC circuitry converts the luminance value into the analog command brightness signal or an output voltage. The DAC circuitry may be a part or separate from the control circuitry 108.

The voltage divider circuitry may divide the output voltage to produce a divided output voltage. The control circuitry 108 may have a microprocessor (not shown) or other circuitry to determine whether the output voltage is to be divided. The control circuitry 108 opens and closes a switching mechanism (see FIG. 3) depending upon whether the output voltage is to be divided. The control circuitry 108 provides the divided output voltage or the undivided output voltage as the command brightness signal to the backlight 102, the display panel 104, or both. The backlight 102 or the control circuitry 108 may have a backlight inverter (not shown) for receiving the output voltage and providing the command brightness signal to the backlight 102. The control circuitry 108 may modify or further adjust the command brightness signal and may combine the command brightness signal with other inputs to operate the backlight display device 100 at the desired or selected brightness.

The voltage divider circuitry may divide the output voltage under some operating conditions and may not divide the output voltage under other operating conditions. The voltage divider circuitry may divide the output voltage when lower luminance values are used, such as during nighttime conditions. The divided output voltage is a fractional portion of the output voltage. A fractional portion includes any value less than the output voltage. In one aspect, the fractional portion is in the range of about 3 percent through about 50 percent.

The user interface 112 enables a user to interact with the backlight display device 100. The user interface 112 may provide one or more input digital or analog signals to the control circuitry 108. The input signal may indicate one or more user preferences for brightness of the backlight display device 100. In one aspect, the user interface 112 is disposed in or on the outer surface of the bezel 106. The user interface 112 may be one or more knobs or push buttons. The user interface 112 also may be other types of manual controls, a touch screen, electronic input from another device, and the like. The user interface 112 may be located elsewhere, may be incorporated with another controller or user interface, and may be included in a remote control device.

The ambient light sensor 114 is connected to provide an input or analog signal to the control circuitry 108. The input signal may be indicative of the ambient light on the display panel 104. The ambient light sensor 114 may include a photodiode (not show) and may be a logarithmic sensor or another type of sensor. The ambient light sensor 114 may have a logarithmic amplifier (not shown), other components, and other configurations. The logarithmic amplifier may be part of the control circuitry 108. In one aspect, the ambient light sensor 114 or the photodiode is positioned on an outer surface of the bezel 106. The ambient light sensor 114 or the photodiode may be placed elsewhere.

The ambient light sensor 114 may be temperature compensated and may discriminate between daytime and nighttime conditions for determination of display luminance and control functions. The ambient light sensor 114 may operate in a dynamic range of lighting conditions such as those encountered in an automotive environment. The ambient light sensor 114 may have a dynamic range of about four decades of lighting conditions. In one aspect, the ambient light sensor 114 operates on less than about five volts from a single positive power supply. The ambient light sensor 114 may operate on other voltage ranges and with positive and negative supplies.

In one aspect, the ambient light sensor 114 senses ambient light. A photodiode (not shown) in the ambient light sensor 114 provides an analog signal. A logarithmic amplifier (not shown) amplifies the analog signal. The control circuitry 108 has an analog-to-digital converter (not shown) to convert the analog signal into a first input signal, which may be filtered or averaged. The user interface 112 may provide a second input signal. The control circuitry 108 uses at least one of the first and second input signals to select a brightness or luminance value. The digital-to-analog converter (DAC) circuitry converts the luminance value into a command brightness signal or output voltage for controlling the luminance or brightness of the backlight display device. When lower luminance values are used such as during nighttime and similar applications, the voltage divider circuitry may be used to divide the output voltage.

FIG. 3 is a block diagram and flowchart of a brightness offset error reduction system method for a display device. In one embodiment, digital-to-analog (DAC) converter circuitry 302 is operatively connected to a first amplifier circuit 304, voltage divider circuitry 306, and a second amplifier circuit 308. Operatively connected includes direct or indirect connections as long as the signals or voltages pass electrically or otherwise. Indirect connections may include other circuitry and adjusting or providing other signals or voltages. The DAC converter circuitry 302, first amplifier circuit 304, the voltage divider circuitry 306, and the second amplifier circuit 308 may be provided on one or more integrated circuit (IC) chips. The brightness offset reduction system may have additional or fewer components and other configurations.

The DAC circuitry 302 may include one or more DACs. The DAC circuitry 302 also may have multiple DACs operatively connected in a cascade arrangement. In a cascade arrangement, the output voltage of one DAC is the input voltage of another DAC and the output voltage of the last DAC provides the commanded brightness signal. As previously discussed, the DAC circuitry 302 provides an output voltage.

The first amplifier circuit 304 is connected to receive the output voltage from the DAC circuitry 302. The first amplifier circuit 304 may include a first operational amplifier 316 operatively connected from the noninverting input through a resistor 312 to the DAC circuitry 302. In this aspect, the resistor 312 is connected in parallel to a first grounded resistor 310. The resistor 312 also is connected in parallel to a resistor 314, connected to an offset reference voltage $V_{OFF}$. The resistor 314 may be grounded. The operational amplifier 316 has a negative feedback loop including a resistor 320 in parallel with a second grounded resistor 318. The first amplifier circuit 304 may have other configurations and circuitry including multistage amplifiers and additional or fewer components. The first amplifier circuit 304 is operatively connected to provide an amplified output voltage to the voltage divider circuitry 306. In one aspect, the output voltage from the DAC circuitry 302 is amplified by times a gain factor and offset by the offset reference voltage $V_{OFF}$.

The second amplifier circuit 308 is operatively connected to receive a divider output signal from the voltage divider circuitry 306. The second amplifier circuit 308 may include a second operational amplifier 328 with a negative feedback loop having a resistor 332 in series with a capacitor 334. The feedback loop is connected in parallel with a resistor 330, which maybe connected to a photopic feedback signal offset by $V_{OFF}$. The second amplifier circuit 308 may have other configurations and circuitry including multistage amplifiers and additional or fewer components. The second amplifier circuit 308 is operatively connected to provide the command brightness signal $V_{BRITE}$ to the backlight, the display panel, or both.

In this embodiment, the voltage divider circuitry 306 receives the amplified output voltage from the first amplifier circuit 304 and provides a divider output signal to the second amplifier circuit 308. The divider output signal may be the amplified output voltage or a divided output voltage. In one aspect, the divider circuitry 306 has a first divider resistor 322 between the first amplifier circuit 304 and the second amplifier circuit 328. A second divider resistor 324 is connected in parallel with the first divider resistor 322. The second divider resistor 324 is connected to a switch 326. The voltage divider circuitry 306 may have additional or fewer components and may have different configurations. For example, the voltage divider circuitry is without the switch 326. In another example, the switch 326 or resistor 324 is grounded and/or three or more selectable amounts of division are provided.

The switch 326 may be any switching mechanism suitable for the circuit design of the divider circuitry 306, such as a transistor or relay. In one aspect, the switching mechanism has a JFET or MOS type transistor. A bipolar transistor may introduce a saturation voltage offset error. The switch may be positioned at other locations in the voltage divider circuitry 306. As discussed previously, the control circuitry opens and closes the switch 326 depending upon whether the amplified output voltage is to be divided. The switch 326 may be part of or operatively connected to enabling circuitry (not shown) that opens and closes the switch 326. The enabling circuitry may include another DAC and a transistor. When the switch 326 is open or disengaged, the divider circuitry 306 passes the amplified output voltage onto the second amplifier circuit 308 as the divider output signal. When the switch 326 is closed or engaged, the divider circuitry 306 divides the amplified output voltage and provides a divided output voltage to the second amplifier circuit 308 as the divider output signal.

When the switch 326 is closed or engaged, the second divider resistor 324 is connected to the offset reference voltage $V_{OFF}$. The voltage divider circuitry 306 divides the amplified output voltage by a divider ratio D. The divider ratio D may be any value suitable for dividing the amplified output voltage and may be calculated by the following equation:

$$D = \frac{R_{324}}{R_{322} + R_{324}}, \qquad \text{(Eqn. 1)}$$

where $R_{322}$ is the resistance provided the resistor 322 and $R_{324}$ is the resistance provided by the resistor 324. In one aspect, $R_{322}$ is about 3,240 ohms and $R_{324}$ is about 475 ohms, resulting in a divider ratio D of about 0.13. In another aspect, $R_{322}$ is about 3,240 ohms and $R_{324}$ is about 133 ohms, resulting in a divider ratio D of about 0.04. In yet another aspect, the divider circuitry is selected to provide a divider ratio D in the range of about 0.04 through about 0.15. Different size resistors and other circuit arrangements may be used to obtain the same or different divider ratios.

In one aspect, the voltage divider circuitry 306 reduces the brightness offset errors from the DAC circuitry 302 during low luminance levels, such as luminance levels encountered in a nighttime automobile environment. The voltage divider circuitry may reduce constant error over essentially an entire dynamic range and may reduce other DAC errors such as quantization errors and linearity errors. The human system perceives changes in brightness non-linearly and logarithmically. A user perceives a brightness change from about 10 nits to about 12 nits (a ratio of about 1.2 or its inverse) as essentially equal to a brightness change from about 100 nits to about 120 nits (a ratio of about 1.2 or its inverse). As the brightness level decreases, more brightness control resolution provides the brightness step changes perceived as uniform by a user. In addition, the acceptable amount of brightness offset error decreases as the luminance or brightness level decreases.

A brightness offset error may introduce an offset brightness, which is the difference in brightness between the selected brightness or luminance value provided to the DAC circuitry 302 and the brightness produced by the output voltage from the DAC circuitry 302. The effect of brightness offset errors on the perceived brightness ratios may be understood by calculating a percent ratio error %RE as follows:

$$\frac{B_{N+1}}{B_N} = \frac{B_{N+1} \pm Bos}{B_N \pm Bos} = R \pm \frac{R(\%RE)}{100}, \qquad \text{(Eqn. 2)}$$

where B is the brightness, $B_N$ is the minimum night brightness level, $B_{N+1}$ is the next brightness level or brightness adjustment step above the minimum night brightness level, N is the brightness step number, $B_{OS}$ is the offset brightness, and R is the brightness ratio (the ratio luminance values between brightness steps). In this aspect, $B_{OS}$ is essentially the same for both brightness steps $B_N$ and $B_{N+1}$. Equation 2 may be solved for the percent ratio error %RE as follows:

$$\pm\%RE = 100 \cdot \left[\frac{B_N \pm Bos/R}{B_N \pm Bos} - 1\right] \qquad \text{(Eqn. 3)}$$

Referring to Equation 3, the percent ratio error %RE increases as the minimum night brightness level $B_N$ decreases. The percent ratio error %RE also increases as brightness ratio R is increased. To reduce the percent ratio error %RE, the voltage divider circuit 306 may be used to divide the output voltage from the DAC circuitry 302. The switch 326 may be closed during low luminance levels, such as nighttime levels and the like. The switch 326 also may be closed during all or part of the luminance levels associated with nighttime applications. The switch 326 also may be closed during other luminance levels. In one aspect, the low luminance levels are less than about 100 nits. In another aspect, the low luminance levels have a range of about 0.5 nits through about 60 nits. In yet another aspect, the low luminance levels may have a range between about 0.5 nits through about 30 nits.

When the switch 326 is closed or engaged, the brightness offset error of the DAC circuitry 302 is attenuated by the divider ratio D. To maintain essentially the same output brightness, the luminance value or data value provided to the DAC circuitry 302 is adjusted by the divider ratio D. In one aspect, the luminance value is increased by the inverse of the divider ratio (1/D).

When the voltage divider circuitry 304 is enabled, the percent ratio error %RE may be calculated as follows:

$$\%DividedRE = \%DRE = 100 \cdot \left[ \frac{B_N \pm (Bos)(D)/R}{B_N \pm (Bos)(D)} - 1 \right] \quad \text{(Eqn. 4)}$$

The percent reduction of the percent ratio error, %Reduction of the %RE (%RED%RE), may be calculated as follows:

$$\%RED\%RE = 100 \cdot (\%RE - \%DRE) / \%RE \quad \text{(Eqn. 5)}$$

$$\%RED\%RE = 100 \cdot (D)(B_N \pm Bos) / (B_N \pm Bos \cdot D) \quad \text{(Eqn. 6)}$$

Figure 4:
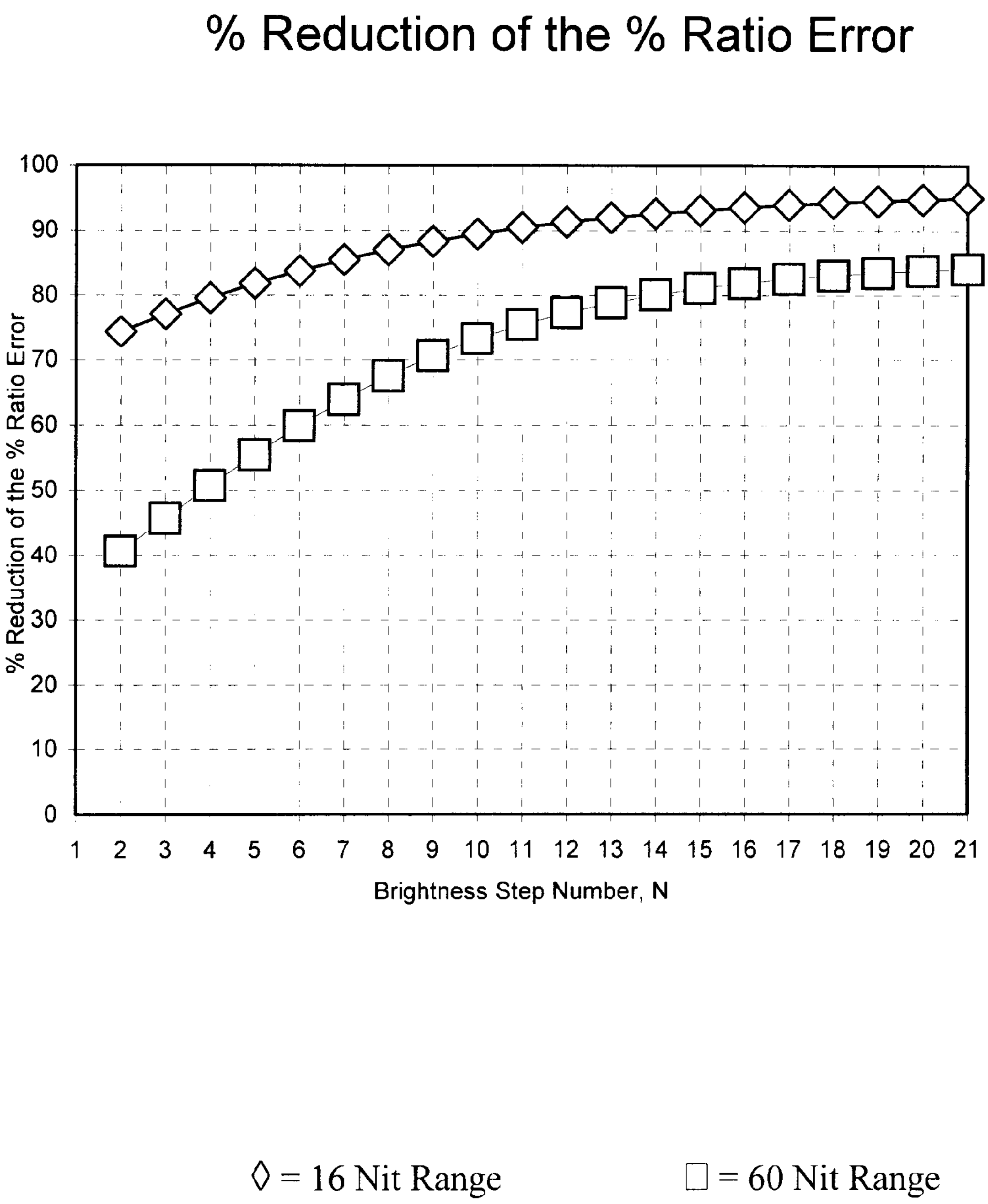
FIG. 4 shows the relationship between the percent reduction of percent ratio error and the brightness step number.

FIG. 4 is a chart showing the relationship between the percent reduction of percent ratio error (%Reduction of %RE) and the brightness step number N according to Equation 6. The %Reduction of %RE is plotted for nighttime brightness maximums of 16 nits and 60 nits, which may represent the range limits for nighttime brightness. The voltage divider circuitry 306 may provide an improvement in the ratio error from about 40% through about 95% depending on the brightness level, the brightness step number, and the nighttime maximum brightness.

The maximum specified value for offset brightness $B_{OS}$ may vary and depends on the DAC. In automotive and similar applications, an offset brightness $B_{OS}$ of about 3.63 nits maybe the maximum specified value for a cost effective DAC. In one aspect, the voltage divider circuitry 306 essentially divides the 3.63 nits by the ratio of night to day maximum brightness values to provide the brightness ratio error reduction.

Figure 5:
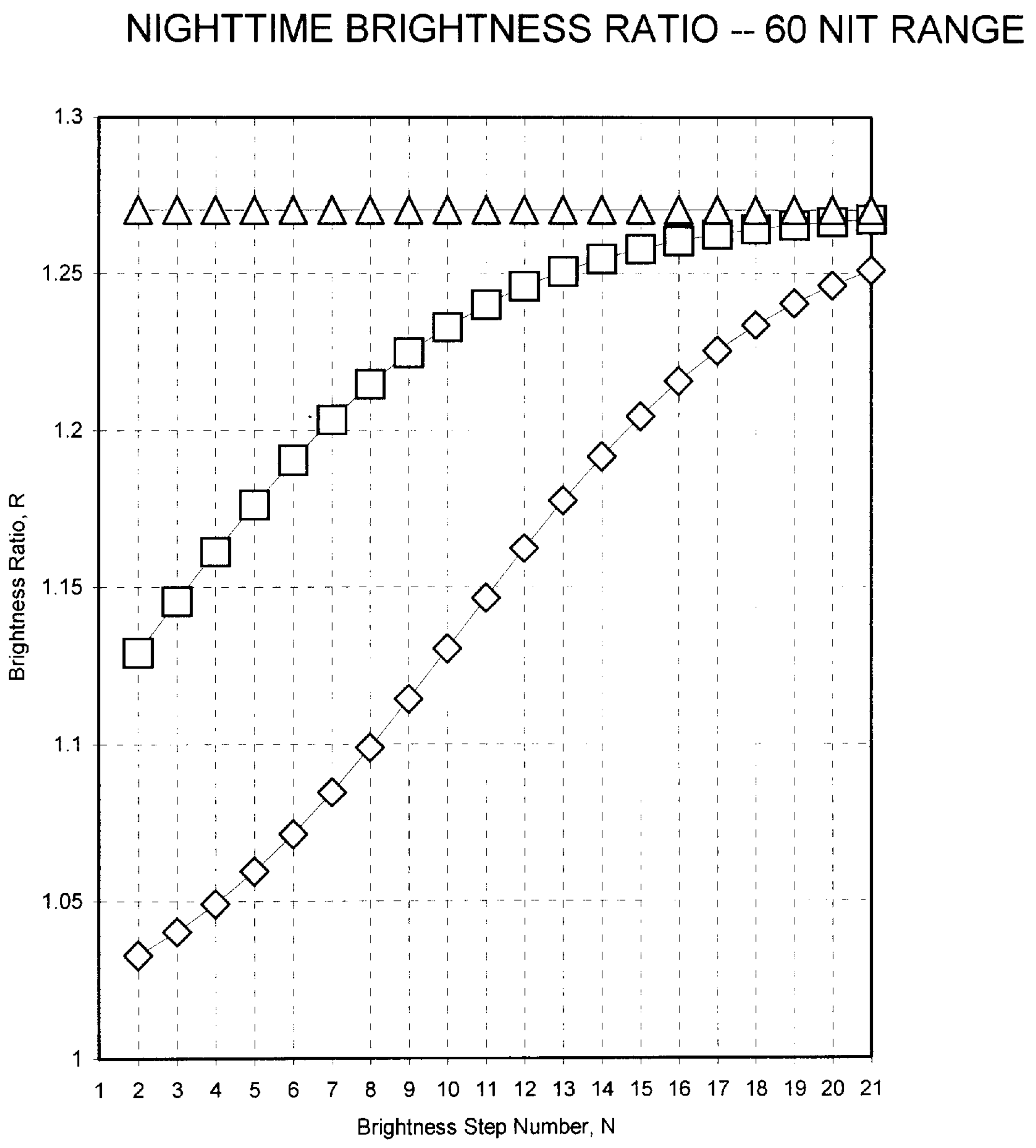
FIG. 5 shows a comparison of nighttime brightness ratios for a maximum brightness range limit of 60 nits.
Figure 6:
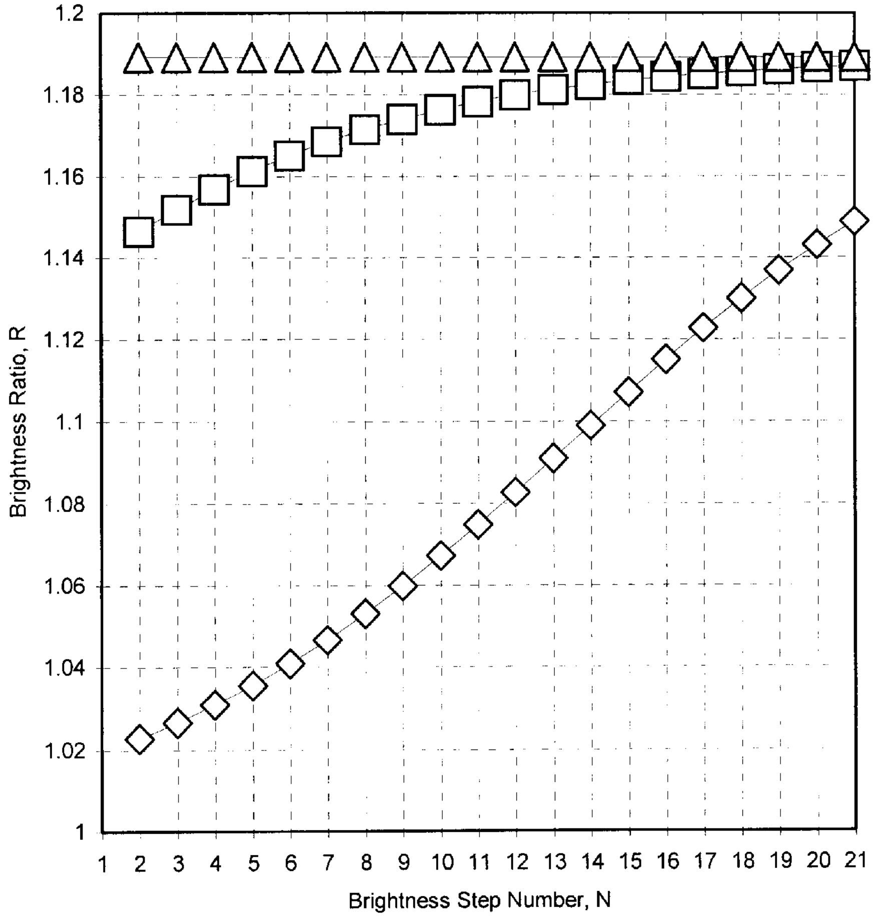
FIG. 6 shows a comparison of nighttime brightness ratios for a maximum brightness range limit of 16 nits.

FIG. 5 shows a comparison of nighttime brightness ratios for a maximum brightness range limit of 60 nits. FIG. 6 shows a comparison of nighttime brightness ratios for a maximum brightness range limit of 16 nits. These figures compare the brightness ratios from the divided output voltage to the brightness ratios from the "not divided" output signal or the amplified output signal. The desired brightness ratios are shown for comparison. In this aspect, the voltage divider improves performance more at lower luminance values (smaller brightness step numbers). The divider ratio D decreases the DAC offset error. The ratio error may be reduced significantly to provide suitable performance.

In another aspect, the divider ratio D may be used only for part of or the lower nighttime steps. Once a maximum divided brightness is reached, the switch 326 may be opened or disengaged to provide higher nighttime brightness. The maximum divided brightness may be about 30 nits in a nighttime brightness range of about 0.5 nits through about 60 nits. In one aspect, the maximum divided brightness is selected to avoid a noticeable brightness ratio jump when the switch is disengaged.

In this embodiment, an offset reference voltage $V_{OFF}$ allows the operational amplifiers 316, 328, and 336 to be operated with single-ended voltage supplies such as those encountered in automotive applications. Single-ended supplies essentially eliminate the need for additional power supply circuitry (not shown) for negative supply voltages (not shown). By connecting the resistor 314 and the switch 326 to the offset reference voltage $V_{OFF}$ instead of to ground, the voltage divider circuitry 306 operates with respect to $V_{OFF}$ regardless of whether the switch 326 is open or closed. In one aspect, the output of a third operational amplifier 336 is connected to the second operational amplifier 328. The third operational amplifier 336 may be configured to have $V_{OFF}$ added to a feedback signal. In one aspect, $V_{OFF}$ is added to a backlight luminance signal. The second operational amplifier 328 compares the backlight luminance feedback signal to the output signal from the voltage divider circuitry 306, thereby canceling $V_{OFF}$. In one aspect, $V_{OFF}$ is selected to be greater than the lower operational limits of the operational amplifiers 316 and 328 when the negative supply for the amplifiers is connected to ground (single ended).

Separate or a common voltage supply (not shown) may provide the offset reference voltage $V_{OFF}$ to each stage. The offset reference voltage $V_{OFF}$ may be any voltage suitable for operating the voltage divider circuitry and the display device. In one aspect, the offset reference voltage $V_{OFF}$ is less than about 1.5 volts. In another aspect, the offset reference voltage $V_{OFF}$ is in the range of about 0.5 volts through about 1.5 volts.

When the switch 326 is open or disengaged for daytime or other operation, the transfer equation for the amplified output voltage may be calculated as follows:

$$V_{328+} = Vo_{316} = \left[1 + \frac{R_{320}}{R_{318}}\right] \cdot \left[\frac{R_{314} \cdot Vo_{302}}{R_{314} + R_{312}} + \frac{R_{312} \cdot V_{OFF}}{R_{314} + R_{312}}\right], \quad \text{(Eqn. 7)}$$

$$V_{328+} = \left[\frac{R_{318} + R_{320}}{R_{314} + R_{312}}\right] + \left[\frac{R_{314} \cdot Vo_{302}}{R_{318}} + \frac{R_{312} \cdot V_{OFF}}{R_{318}}\right], \quad \text{(Eqn. 8)}$$

where $V_{OFF}$ is the offset reference voltage, $Vo_{302}$ is the output voltage provided by the DAC circuitry 302, $Vo_{316}$ is the amplified output voltage provided by the first operational amplifier 316, $V_{328+}$ is the noninverting input signal or the divider output signal provided to second operational amplifier 328, $R_{312}$ is the resistance provided by the resistor 312, $R_{314}$ is the resistance provided by the resistor 314, $R_{318}$ is the resistance provided by the resistor 318, and $R_{320}$ is the resistance provided by the resistor 320.

If $R_{314}$ is essentially equal to $R_{320}$ and if $R_{312}$ is essentially equal to $R_{318}$, Equation 8 may be reduced as follows:

$$V_{328+} = Vo_{316} = \frac{R_{320} \cdot Vo_{302}}{R_{318}} + V_{OFF} \quad \text{(Eqn. 9)}$$

When the switch 326 is open or disengaged, the divider output signal from the voltage divider circuitry 306 is essentially the amplified output signal and may be calculated as a gain factor times the output voltage from the DAC circuitry 302 and offset by the offset reference voltage $V_{OFF}$.

When the switch 326 is closed or engaged, the divider output signal or the transfer function from the voltage divider circuitry 306 may be calculated as follows:

$$V_{328+} = \left[\frac{R_{324}}{R_{322}+R_{324}}\right]\cdot(Vo_{316}-V_{OFF})+V_{OFF} \quad \text{(Eqn. 10)}$$

Substituting in Equation 8 for $Vo_{316}$ yields the following equation:

$$V_{328+} = \left[\frac{R_{324}}{R_{322}+R_{324}}\right]\cdot\left[\frac{R_{320}\cdot Vo_{302}}{R_{318}}\right]+V_{OFF} \quad \text{(Eqn. 11)}$$

In this aspect, the voltage divider circuitry 306 divides the amplified or gained output voltage from the DAC circuitry 302 and offsets by $V_{OFF}$.

The offset error reduction system may be provided in an automotive, handheld electronics, lap tops, display screens or other single supply environment. The offset error reduction system may be applied to virtually any brightness control system to reduce offset errors. The offset error reduction system may be used when lower luminance levels (such as the maximum nighttime brightness) are a divided ratio of higher luminance levels (such as the maximum daytime brightness) or for any other luminance levels.

Various embodiments of the invention have been described and illustrated. However, the description and illustrations are by way of example only. Many more embodiments and implementations are possible within the scope of this invention and will be apparent to those of ordinary skill in the art. Therefore, the invention is not limited to the specific details, representative embodiments, and illustrated examples in this description. Accordingly, the invention is defined by the accompanying claims and their equivalents.

What is claimed is:

1. A display device having a brightness offset error reduction system, comprising:

a lighted display;

digital-to-analog converter (DAC) circuitry; and voltage divider circuitry operatively connected to receive an output voltage from the DAC circuitry, where the voltage divider circuitry provides a fractional portion of the output voltage as a divided output voltage to the lighted display.

2. The display device according to claim 1, where the lighted display further comprises:

a display panel; and a backlight operatively disposed adjacent to the display panel.

3. The display device according to claim 2, where the display panel is an active matrix liquid crystal display.

4. The display device according to claim 2, where the backlight comprises at least one of a cold cathode fluorescent lamp, an electro-luminescent lamp, and a light emitting diode (LED).

5. The display device according to claim 2, where the voltage divider circuitry provides the divided output voltage to at least one of the display panel and the backlight.

6. The display device according to claim 1, where the lighted display is a backlit display.

7. The display device according to claim 1, where the lighted display is a frontlit display.

8. The display device according to claim 1, where the lighted display is an emissive display.

9. The display device according to claim 1, where the lighted display comprises a pixel light source.

10. The display device according to claim 9, where the pixel light source comprises a light emitting diode.

11. The display device according to claim 1, where voltage divider circuitry further comprises a switching mechanism connected to one of a reference and ground.

12. The display device according to claim 11, where the reference voltage is less than about 1.5 volts.

13. The display device according to claim 11, where the switching mechanism is engaged in response to an operating condition of the display device.

14. The display device according to claim 13, where the operating condition is nighttime.

15. The display device according to claim 11, where the DAC circuitry provides the output voltage in response to a luminance value, and where the switching mechanism is engaged in response to the luminance value.

16. The display device according to claim 15, where the switching mechanism is engaged when the luminance value is in the range of about 0.5 nits through about 60 nits.

17. The display device according to claim 15, where the switching mechanism is engaged when the luminance value is in the range of about 0.5 nits through about 15 nits.

18. The display device according to claim 1, where the fractional portion is in the range of about 3 percent through about 50 percent.

19. The display device according to claim 1, where the DAC circuitry provides the output voltage in response to a luminance value, where the luminance value is adjusted by a divider ratio D.

20. The display device according to claim 19, where the luminance value is increased by the inverse of the divider ratio (1/D).

21. The display device according to claim 11, the voltage divider circuitry further comprising:

a first resistor operatively connected to the DAC circuitry; and a second resistor connected in parallel to the second resistor, the second resistor connected in series to the switching mechanism.

22. The display device according to claim 21, where the first and second resistors have a divider ratio D, represented by the equation, $D=R_2/(R_1+R_2)$, where $R_1$ is the resistance provided by the first resistor and $R_2$ is the resistance provided by the second resistor.

23. The display device according to claim 21, where the voltage divider circuitry further comprises:

a first amplifier operatively connected to receive the output voltage from the DAC circuitry, an output of the first amplifier operatively connected to the first resistor; and a second amplifier operatively connected to receive one of the output signal and the divided output signal from the first and second resistors, an output of the second amplifier operatively connected to the lighted display.

24. The display device according to claim 1, further comprising;

a first amplifier operatively connected to receive the output voltage from the DAC circuitry, an output of the first amplifier operatively connected to the voltage divider circuitry; and a second amplifier operatively connected to receive the divided output voltage from the voltage divider circuitry, the second amplifier to provide the divided output voltage to the lighted display panel.

25. The display device according to claim 1, further comprising:

a light sensor disposed to sense ambient light on the display panel; and control circuitry connected to receive an input signal from the light sensor, where control circuitry selects a luminance value in response to the input signal, and where the output voltage corresponds to the luminance value.

26. The display device according to claim 25, where the light sensor is a logarithmic sensor.

27. The display device according to claim 1, further comprising:

a user interface; and control circuitry connected to receive an input signal from the user interface, where the control circuitry selects a luminance value in response to the input signal, and where the output voltage corresponds to the luminance value.

28. The display device according to claim 1, where the DAC circuitry is provided on at least one integrated circuit (IC) chip.

29. The display device according to claim 1, where the display device is part of a navigation radio.

30. The display device according to claim 1, where the display device comprises a display of an electronic device.

31. The display device according to claim 30, where the electronic device is one of a communication device, a personal computer, and a personal organizer.

32. A brightness offset error reduction system for a display device, comprising:

digital-to-analog converter (DAC) circuitry; and voltage divider circuitry having a switching mechanism, the voltage divider circuitry operatively connected to receive an output voltage from the DAC circuitry, where the voltage divider circuitry provides a divided output voltage when the switching mechanism is engaged.

33. The brightness offset error reduction system according to claim 32, where the divided output voltage is in the range of about 3 percent through about 50 percent of the output voltage.

34. The brightness offset error reduction system according to claim 32, the voltage divider circuitry further comprising:

a first resistor operatively connected to the DAC circuitry; and a second resistor connected in parallel to the first resistor, the second resistor connected in series to the switching mechanism.

35. The brightness offset error reduction system according to claim 34, where the switching mechanism is connected to one of a reference voltage and ground.

36. The brightness offset error reduction system according to claim 35, where the reference voltage is in the range of about 0.5 volts through about 1.5 volts.

37. The brightness offset error reduction system according to claim 34, where the first resistor provides a resistance of about 3,240 ohms, and where the second resistor provides a resistance in the range of about 133 ohms through about 475 ohms.

38. The brightness offset error reduction system according to claim 34, where the first and second resistors have a divider ratio D, represented by the equation, $$D = \frac{R_2}{R_1 + R_2},$$

where $R_1$ is the resistance provided by the first resistor and $R_2$ is the resistance provided by the second resistor.

39. The brightness offset error reduction system according to claim 38, where the divider ratio is in the range of about 0.04 to 0.15.

40. The brightness offset error reduction system according to claim 34, the voltage divider circuitry further comprising:

a first amplifier operatively connected to receive the output voltage from the DAC circuitry, an output of the first amplifier connected to the first resistor; and a second amplifier operatively connected to receive the divided output voltage from the first and second resistors.

41. The brightness offset error reduction system according to claim 32, further comprising:

a first amplifier operatively connected to receive the output voltage from the DAC circuitry, an output of the first amplifier connected to the voltage divider circuitry; and a second amplifier operatively connected to receive the divided output voltage from the voltage divider circuitry.

42. The brightness offset error reduction system according to claim 32, the DAC circuitry further comprising a plurality of digital-to-analog converters operatively connected to have a cascade arrangement.

43. The brightness offset error reduction system according to claim 26, where at least one of the DAC circuitry and the voltage divider circuitry is provided on at least one integrated circuit (IC) chip.

44. A method for reducing the brightness offset error in a display device, comprising:

(a) converting a luminance value into an output voltage;

(b) determining whether the output voltage is to be divided; and (c) providing a fractional portion of the output voltage if the output voltage is to be divided.

45. The method according to claim 44, where (b) further comprises determining the output voltage is to be divided when the luminance value indicates a nighttime condition.

46. The method according to claim 44, where (b) further comprises determining the output voltage is to be divided when the luminance value is in the range of about 0.5 nits through about 60 nits.

47. The method according to claim 44, where (b) further comprises determining the output voltage is to be divided when the luminance value is in the range of about 0.5 nits through about 15 nits.

48. The method according to claim 44, where the fractional portion is in the range of about 3 percent through about 50 percent.

49. The method according to claim 44, where (c) further comprises dividing the output voltage by a divider ratio D.

50. The method according to claim 49, further comprising:

(d) adjusting the luminance value by the divider ratio D.

51. The method according to claim 50, where (d) further comprises increasing the luminance value by the inverse of the divider ratio (1/D).

52. The method according to claim 44, further comprising:

(d) providing a reference voltage with the output voltage; and (e) removing the reference voltage.

53. The method according to claim 52, where the reference voltage is less than about 1.5 volts.

54. The method according to claim 44, further comprising:

(d) providing the output voltage when the output voltage is not divided.

55. The method according to claim 54, further comprising:

(e) providing a reference voltage with the output voltage; and (f) removing the reference voltage.

56. The method according to claim 55, where the reference voltage is less than about 1.5 volts.

57. The method according to claim 44, further comprising:

(d) selecting the luminance value in response to an input signal from at least one of a light sensor and a user interface.

* * * * *